US009513637B2

(12) United States Patent
Shao

(10) Patent No.: US 9,513,637 B2
(45) Date of Patent: Dec. 6, 2016

(54) INTERNET OF THINGS INTELLIGENT GAS METER AND CONTROL SYSTEM

(76) Inventor: Zehua Shao, Chengdu (CN)

( * ) Notice: Subject to any disclaimer, the term of this patent is extended or adjusted under 35 U.S.C. 154(b) by 553 days.

(21) Appl. No.: 13/981,538

(22) PCT Filed: Jan. 13, 2012

(86) PCT No.: PCT/CN2012/070312
§ 371 (c)(1),
(2), (4) Date: Jul. 24, 2013

(87) PCT Pub. No.: WO2012/100686
PCT Pub. Date: Aug. 2, 2012

(65) Prior Publication Data
US 2013/0304264 A1    Nov. 14, 2013

(30) Foreign Application Priority Data

Jan. 25, 2011   (CN) .......................... 2011 1 0025763

(51) Int. Cl.
G05D 7/06         (2006.01)
G01D 4/00         (2006.01)

(52) U.S. Cl.
CPC ............ G05D 7/0629 (2013.01); G01D 4/004 (2013.01); *Y02B 90/242* (2013.01); *Y04S 20/322* (2013.01)

(58) Field of Classification Search
CPC ................................... G05D 7/0629
USPC ........................................ 700/282
See application file for complete search history.

(56) References Cited

U.S. PATENT DOCUMENTS 5,432,507 A * 7/1995 Mussino .............. H04Q 9/00
340/10.1

6,874,691 B1 * 4/2005 Hildebrand ......... H04L 12/2818
236/51

(Continued)

FOREIGN PATENT DOCUMENTS

CN      101349900      1/2009
CN      101404099      4/2009

(Continued)

OTHER PUBLICATIONS

Oracle "Oracle Utilities Customer Care and Billing: Business Process Guide" vol. 1 Release 2.3.1. Sep. 2010, 418 Pages.*

(Continued)

*Primary Examiner* — Mohammad Ali
*Assistant Examiner* — Emilio J Saavedra
(74) *Attorney, Agent, or Firm* — Hamre, Schumann, Mueller & Larson, P.C.

(57) ABSTRACT

This invention discloses an Internet of things (IoT) intelligent gas meter and its control system. It is a kind of intelligent gas meter consisting of a base meter, a CPU control module and a data transmission module. A gas source outlet and a gas source inlet are installed on the base meter, and an electromechanical valve is installed near the gas source inlet. The CPU control module is connected to the base meter and sends control signals to the base meter. The gas consumption criterion of the base meter can be adjusted via the CPU control module; The said CPU control module includes an EEPROM data storage device; the data transmission module is indirectly connected to the IoT and connected to a remote computer management system via the IoT; the data transmission module receives the control signal from the remote computer management system and feeds back gas consumption information of the gas meter sent by the CPU control module to the computer management system. This invention provides an IoT intelligent gas meter and relevant control system that could be applied to all the gas supply networks with wide scope of application and convenience for promotion.

8 Claims, 3 Drawing Sheets

(56) References Cited

U.S. PATENT DOCUMENTS 6,885,309 B1 * 4/2005 Van Heteren .......... G08C 15/06
340/540
2009/0284392 A1 * 11/2009 Henderson ............. G01D 4/008
340/870.3

FOREIGN PATENT DOCUMENTS

| CN | 101404099 A * | 4/2009 |
|---|---|---|
| CN | 101425220 | 5/2009 |
| CN | 201638376 | 11/2010 |
| CN | 102063764 | 5/2011 |
| CN | 202049554 | 11/2011 |
| WO | 2009110192 | 9/2009 |

OTHER PUBLICATIONS

International Search Report, from application PCT/CN2012/070312, dated Apr. 26, 2012, 4 pages.

* cited by examiner

INTERNET OF THINGS INTELLIGENT GAS METER AND CONTROL SYSTEM

FIELD

This invention involves an intelligent gas meter, more specifically, an internet of things (IoT) intelligent gas meter and its control system.

BACKGROUND

At present, the domestic energy price is geared to the international standard. And due to the straining resources of international oil and gas, the price fluctuates frequently, leading to the frequent adjustment of gas rate. Therefore, it requires improvement of the gas meter. The purpose is to realize the functions of gas measuring, controlling, charging and management. However, domestically the gas meters can be divided into two categories based on the charge method: one is payment before use, such as IC card gas meter; the other is use before payment, such as the common diaphragm gas meter. Between the gas meters with two charge methods, the former is featured by the fact that once the gas fee is used up, the gas supply is stopped, and the user must buy the gas with IC card at designated stores and finish the relevant gas transmission procedures before the gas supply is resumed. However, artificial unreliable factors exist in the data exchange between the IC card and the gas meter. And the gas fee is out of real time control, such as gas fee adjustment by the gas supplier. For the latter, there are difficulties in data transcription, charging of gas fee, and inconvenience in use on the part of the gas user. The IC card gas meter adopts a charge method of gas volume ($m^3$); the gas company sells the gas volume in advance; the user stores the purchased volume in the gas meter. The disadvantage of this method is that when the gas price is adjusted, the gas company can't adjust the price for the remaining volume of gas stored in the meter. Such hysteretic nature may lead to the hoarding of gas by the user, causing a loss to the gas company. And for the traditional diaphragm gas meter based on meter reading, unified price adjustment is also unavailable since a time period is inevitable in the meter reading by households.

In addition, the remote gas meters currently on market record the consumption base on volume. When the gas price is adjusted remotely, the remaining gas volume in the gas meter will change in volume, which will lead to the difference between the purchased volume and the volume of gas available for use. Such conflict in volume measuring mode will also induce disputes between the users and the gas company.

In addition, various remote reading gas meters, remote control gas meters are also appearing on the market. But gas meters of these structures all adopt a point-to-point transmission mode, meaning the gas meters transfers the data to the hand-reading device of the meter reader or the concentrator of the relevant resident district through wired or wireless way. Since the point-to-point transmission and the wireless signal are easily subject to disturbance of external frequencies and buildings, the reading effect is far from satisfactory. Therefore, none of the current gas meters can solve the technical problems of real time gas fee adjustment, feedback of gas meter data of the user, and centralized management, etc.

SUMMARY

This invention is aiming at solving the aforementioned defects, providing an IoT intelligent gas meter and its control system based on the transmission of IoT, and adopting supporting network management system.

To solve the aforementioned technical problems, the invention adopts the following technical proposal:

On one hand, this invention provides an IoT intelligent gas meter, including base meter, CPU control module and data transmission module. The base meter has gas output and input ports, around the latter, mechanical and electrical vales are instalLCD. The CPU control module is connected to and sends control signals to the base meter. The gas consumption standard can be adjusted based on the CPU control module, which includes EEPROM data memory; the data transmission module is indirectly connected to the IoT, and the remote computer management system through the IoT. The data transmission module receives control signal from the remote computer management system while feeding the data of the gas meter sent by the CPU control module back to the computer management system; the data transmission module consists of signal transmitter and receiver, which exchanges data with the CPU control module through the data command bus. The signal transmitter is connected with the data concentrator through wired or wireless way, while the data concentrator is connected to the internet through network communication protocol, sending the gas consumption statuses collected from the gas meters to the computer management system through internet in the form of data package; the CPU control module adjusts and encrypts the data in the EEPROM data memory, and then sends the encrypted data packages to the internet through the signal transmitter in the data transmission module according to the designated communication protocol. The data packages are then forwarded to the computer management system through internet.

Further technical proposal is: the computer management system sends the control signal in the form of data package through internet to the data concentrator, which sends the control signal it received to the data transmission module on the gas meter through wired or wireless way.

Further on technical proposal is: the data command bus is bus RS485; the internet communication protocol is the TCP/IP or UDP communication protocol.

Other features of the invention: the wireless transmission mode could be infrared signal, photoelectric signal, ultrasonic signal, microwave signal, or GPRS signal; the wired transmission mode could be optic fiber transmission, power line carrier, RS232 bus, RS485 bus, M-BUS instrument bus, or CAN bus.

Further technical proposal is: the data packages received and sent by the data concentrator are encrypted by the CPU control module. The signal transmitter packs the signal during transmission, while the signal receiver upon receiving the external signal, unpacks the signal into executable operation command, and transmits the command to the CPU control module through data command bus for decryption and operation.

Another technical proposal is: the said CPU control module also consists of FLASH program memory to store the control program in the CPU control module. Through the program designation in the FLASH program memory, the gas meter finishes the signal receiving and feedback processing.

A third technical proposal is: the said CPU control module mainly includes CPU controller, which is connected to counting dry reed pipe sampling circuit, mechanical and electric valve control circuit, number-deducting circuit, and LCD circuit; the CPU control module is connected to the counting dry reed pipe through the counting dry reed pipe sampling circuit; CPU control module connects to the mechanical and electrical valve through the mechanical and electric valve control circuit, controlling the on and off status; CPU control module connects to the LCD display through the LCD circuit, controlling the data display; CPU control module connects to the EEPROM data memory through the number-deducting circuit, and debits the gas meter in combination with the circuit.

On the other hand, the invention provides a control system for the IoT intelligent gas meter. The control system consists of multiple IoT intelligent gas meters, at least one data concentrator and the remote computer management system. Among them, each IoT gas meter is a node in the control system, connecting to and transmitting the data to the data concentrator, which, after collecting data from multiple nodes, send the data to the computer management system through connecting with the internet at the internet port.

Further technical proposal is: the port is any one of the demand-dial interface of phone line, optic fiber broadband interface, ADSL interface, or GPRS interface.

Another technical proposal is: the computer management system integrates charge management system and gas meter working condition management system.

The charge management system includes:

Basic data module: used to realize functions of management station setup, regional setup, meter type setup, payment type setup, manufacturer setup, administrator setup, and invoice format setup.

Gas sales business management module: used to realize functions of opening of account for user, payment, refund, and gas supply operation;

Financial statements management module: used to compile the user's basic information statements, gas user payment statements, gas user meter reading statements and daily statements, monthly statements, and annual statements;

Gas meter working condition management system includes:

Regional management module: used to set up management site, management community, management unit, and management building;

User management module: used to realize the account canceling, account transfer, and adjustment of user's information;

Working state management module: applied for searching history state and current state, of which, the history state search includes remote switch operation history, remote meter reading history, internet payment history, and gas adjustment history; the current state research includes low gas volume alarm, high and low pressure protection, overflow protection, overtime protection, magnet protection, balance amount, accumulated gas consumption, accumulated recharge amount, and current gas price;

Maintenance management module: used to eliminate HP and LP failures, overflow failure, overtime failure, and magnetic disturbance failure;

Meter replacement management module: used to inquiry the information of the recorded faulted meter, record the information of the new meter and transfer the data.

Compared to current technologies, the advantages of the invention include: realizing the each and every terminal equipment's control and communication of the application of IoT on gas meter control system. Through the connection of IoT, the connection between the control terminal and gas meter terminal is no longer limited to the point-to-point control. It realizes the remote control of management and price adjustment, internet payment, cash amount settlement on the terminal gas meters, avoiding gas hoarding caused by the gas purchase volume calculation. In addition, the invention provides an IoT intelligent gas meter and relevant control system that could be applied to all the gas supply networks with wide scope of application and convenience for promotion.

DETAILED DESCRIPTION

Here is further description of the invention in combination with the figure.

Before explaining the specific examples of application of the invention, firstly it is necessary to explain a key word mentioned repeatedly in the invention—"internet of things":

The internet of things (IoT) refers to the internet in which the gas meters are connected to the internet as user terminals through information sensor equipment such as RFID (radio frequency identification), infrared sensor, GPS, laser scanner, etc. according to the agreed protocol, for the purpose of information exchange and communication, so as to realize intelligent identification, location, tracking, monitoring, and management, in other words, an IoT connected to each other.

Application 1

Figure 1:
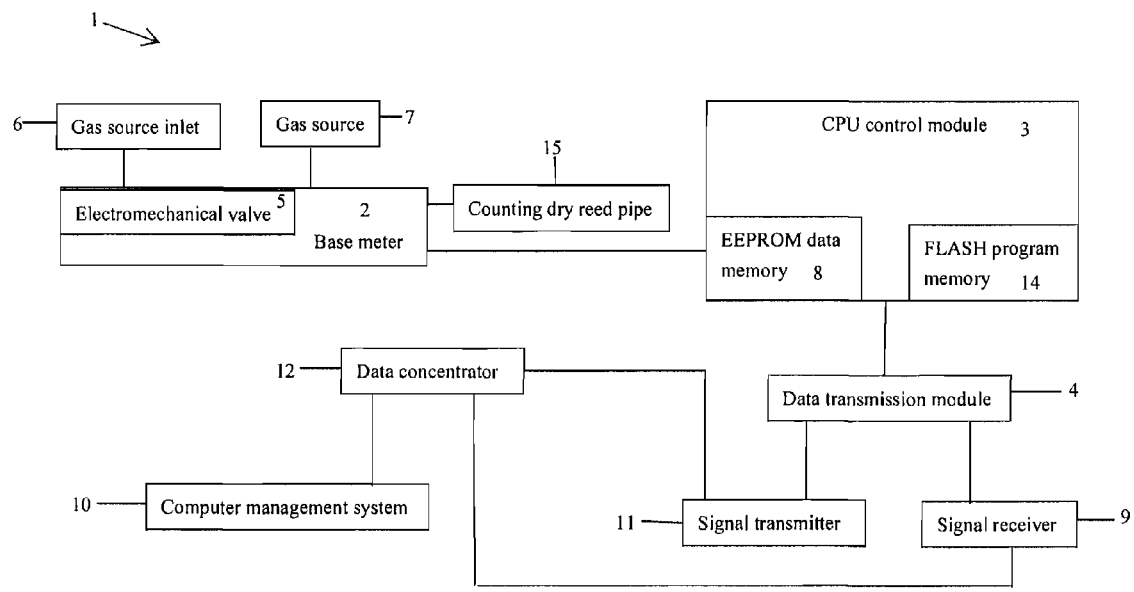
FIG. 1 shows the gas meter structure principle block diagram in Example 1 and Example 2.

As shown in FIG. 1, for the IoT intelligent gas meter 1 in the invention, one installation and application method among the technical proposals includes the basic meter 2, CPU control module 3 and data transmission module 4. The base meter 2 has gas output and input ports, around the latter, mechanical and electrical valves 5 are installed. The CPU control module is connected to and sends control signals to the base meter. The gas consumption standard can be adjusted based on the CPU control module, which includes EEPROM data memory 8; the data transmission module 4 is indirectly connected to the IoT, and the remote computer management system through the IoT. The data transmission module receives control signal from the remote computer management system 10 while feeding the data of a gas meter sent by the CPU control module 3 back to the computer management system; the preference setting in the data transmission module include signal transmitter 11 and receiver 9. The signal receiver 9 exchanges data with the CPU control module 3 through the data command bus 22, which is preferably RS485 bus. The signal transmitter 11 is connected with the data concentrator 12 through wired way, while the data concentrator 12 is connected to the internet 21 through network communication protocol—such as UDP communication protocol—sending the gas consumption statuses collected from the gas meters to the computer management system through internet in the form of data package; the computer management system sends the control signal in the form of data package through internet 21 to the data concentrator 12, which sends the control signal it received to the data transmission module 4 on the gas meter through wireless way. The wireless transmission may vary according to different requirements onsite. Selection may be made among optic fiber transmission, power line carrier, RS232 bus, RS485 bus, M-BUS instrument bus, or CAN bus. However optic fiber transmission is preferred according to the site requirements and current universality of wired signal transmission.

Figure 2:
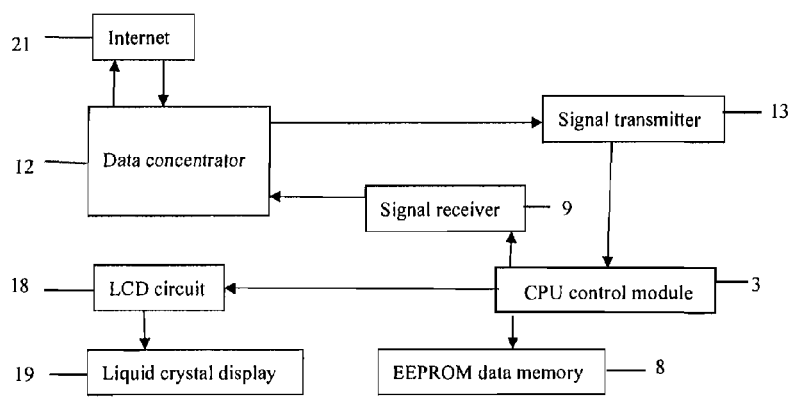
FIG. 2 shows the remote control structure connection block diagram realized in Example 1 and Example 2.

As shown in FIG. 2, the data packages received and sent by the data concentrator 12 are encrypted by the CPU control module 3. The signal transmitter 13 packs the signal during projection, while the signal receiver 9 upon receiving the external signal, unpacks the signal into executable operation command, and transmits the command to the CPU control module 3 through data command bus for decryption and operation. CPU control module 3 also consists of FLASH program memory 14 to store the control program in the CPU control module 3. Through the program designation in the FLASH program memory 14, the gas meter finishes the signal receiving and feedback processing and stores the charging command in the EPPROM data memory 8. The EPPROM data memory 8 can also store ID, user meter number, user's password, accumulated recharging amount, accumulated balance amount, accumulated gas consumption, unit price of gas, alarm amount, working conditions of the gas meter, etc.

Figure 3:
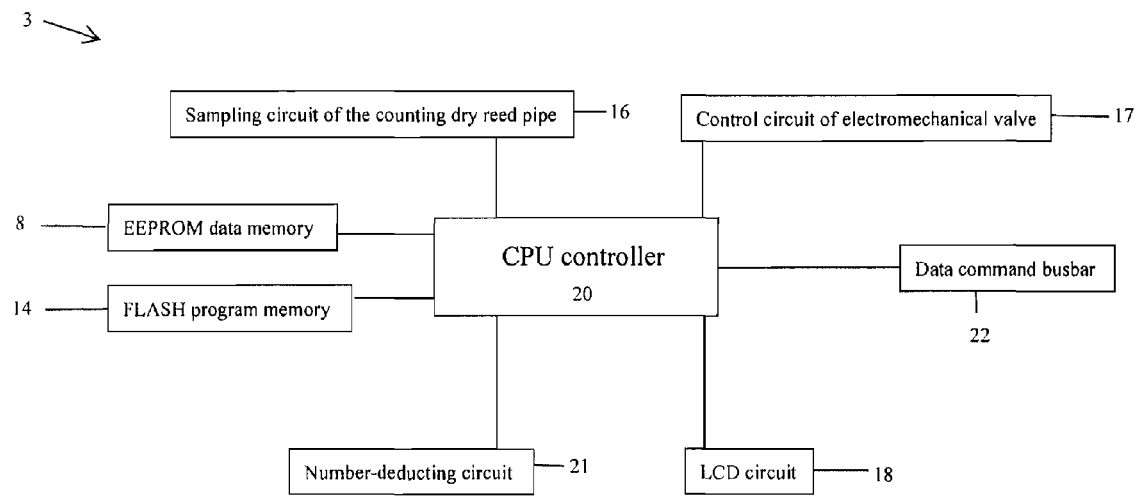
FIG. 3 shows the CPU control module structure block diagram in Example 1 and Example 2.

As shown in FIG. 3, the CPU control module 3 mainly includes CPU controller 20, which is connected to counting dry reed pipe sampling circuit 16, mechanical and electric valve control circuit 17, number-deducting circuit 21, and LCD circuit 18. The CPU control module 3 is connected to the counting dry reed pipe 15 through the counting dry reed pipe sampling circuit 16. The CPU control module 3 connects to the electromechanical valve 5 through the mechanical and electric valve control circuit 17, controlling the on and off status. The CPU control module 3 connects to the LCD display 19 (as shown in FIG. 2) through the LCD circuit 18, controlling the data display. The CPU control module 3 connects to the EEPROM data memory 8 through the number-deducting circuit 21, and debits the gas meter in combination with the circuit.

Application 2

This invention presents an IoT intelligent gas meter 1 as shown in FIG. 1, and another application of its technical program is: as for master meter, CPU control module 3 and data transmission module 4, source gas inlet 6 and outlet 7 are reserved on master meter, and equipped with an electromechanical valve 5 close to inlet. CPU control module 3 is linked to master meter and sends control signal to the latter, and gas consumption standard of master meter can also be adjusted by CPU control module 3. The above described CPU control module 3 contains EEPROM data memory 8, and data transmission module 4 is indirectly linked to IOT, as well as connecting with distant computer control system via IOT. Data transmission module 4 receives control signal from distant computer control system and feeds back gas consumption data of gas meter sent by CPU control module 3 to computer control system. Two devices, as signal transmitter and receiver, are priorities on data transmission module 4. Signal receiver switches data with CPU control module 3 via data command bus 22, and RS485 bus is preferable to be used as data command bus 22. While signal transmitter is linked to data concentrator in wireless way—data concentrator 12 is connected to internet 21 via network communication protocol, and this network communication protocol is inclined to TCP/IP communication protocol, it sends, as a data package, the concentrated gas consumption data of gas meter to computer control system. Then, computer control system sends control signal, as a data package, to data concentrator via internet 21, and data concentrator 12 will transmit received control signal to data transmission module 4 of gas meter by wireless means. Wireless transmission can be one of infrared signal, optoelectronic signal, ultrasonic signal, microwave signal and GPRS signal according to requirement of application situation. The effect of transmission can be determined by varied signal transmission mode, and it can be selected by application situation and area.

As shown in FIG. 2, the received and sent data package of data concentrator is the encoded one of CPU control module 3. Signal transmitter packs signal while dispatching signal, after signal receiver taking the signal, it unpacks signal and transforms it to operational command for execution and transmits it via data command bus 22 to CPU control module 3 for decoding and operation. The FLASH program memory 14 in CPU control module 3 is used for storing control program operating in CPU control module 3. By appointing program in FLASH program memory 14, gas meter can receive and feedback signal and store received charge command in EPPROM data memory 8, and EPPROM data memory 8 can also store data like user ID, number of gas meter, user's code, aggregated amount of charge, total balance, total gas consumption, unit price of purchasing gas, amount of alarm and operating condition of gas meter.

As shown in FIG. 3, CPU control module 3 has CPU controller 20 as main part. CPU controller 20 is connected to sampling circuit of counting dry reed pipe 16, control circuit of electromechanical valve 17, number-deducting circuit 21 and LCD circuit 18. It is connected to counting dry reed pipe 15 (as shown in FIG. 1) in master meter via sampling circuit of counting reed switch 16, to electromechanical valve 5 for controlling its open and close, to LCD screen to control displayed data, to EPPROM data memory 8 via number-deducting circuit 21 to process data of gas meter.

Comparing to the Application 1, this application is the better one for this invention.

Application 3

Figure 4:
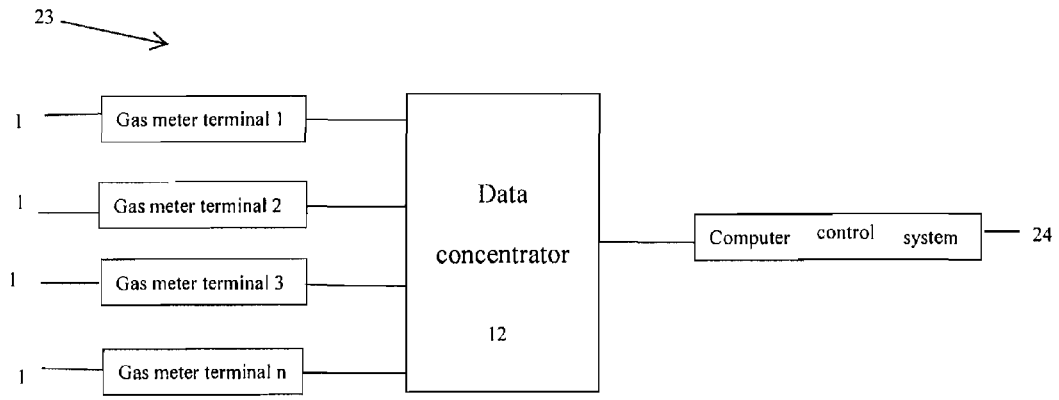
FIG. 4 shows the gas meter control system structure block diagram in Example 3.

This invention, as shown in FIG. 4, provides a control system 23 to control the IoT intelligent gas meter 1 described in Article 1 of Claims. The control system 23 consists of number of IoT intelligent gas meters 1 and data concentrator 12 and distant computer control system 24. The implementation mode of control system described in this example is simple, only with one data concentrator 12 in control system 23. For large gas consumption network, the linked data concentrators 12 with use terminal gas meter can form an IoT. Each IoT intelligent gas meter 1 terminal is a node in control system 23. By collecting data of many nodes, data concentrator 12 will transmit data to computer control system 24 via interface of IoT with internet 21. According to various application situations, the interface of IoT can be selected from dial interface of phone line, fiber broadband interface, ADSL interface and GPRS interface. The current analysis of popularity of internet interface shows that the fiber broadband interface and ADSL interface can be more practical, so these two interfaces are more helpful for application of this invention generated technical program.

Figure 5:
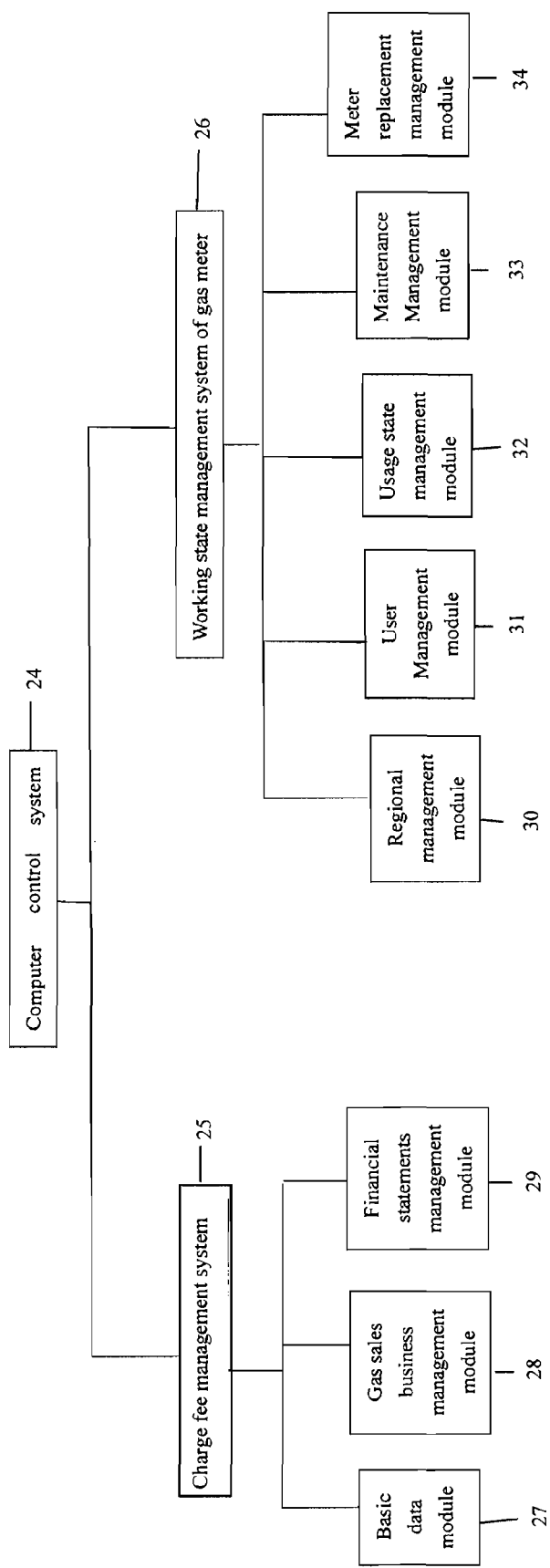
FIG. 5 shows the module structure block diagram of the computer management system in Example 3.

As shown in FIG. 5, fee-collecting management system 25 and working state management system of gas meter 26 operation condition are integrated into computer control system 24. Fee-collecting management system 25 includes:

Basic data module 27: used for management station setting, area setting, setting of meter type, setting of charge type, manufacturer setting, administrator setting and setting of invoice format.

Gas sales management module 28: used for opening an account of gas user, charge, refund and gas compensation.

Financial statement management module 29 of: used for basic data statement of gas user, charge data statement of gas user, meter reading data statement of gas user and preparation of daily, monthly and annual statement.

Working state management system of gas meter 26 includes:

Regional management module 30: used to set up management site, management community, management unit, and management building.

User management module 31: used to realize the account canceling, account transfer, and adjustment of user's information.

Usage state management module 32: applied for searching history state and current state, of which, the history state search includes remote switch operation history, remote meter reading history, internet payment history, and gas adjustment history; the current state research includes low gas volume alarm, high and low pressure protection, overflow protection, overtime protection, magnet protection, balance amount, accumulated gas consumption, accumulated recharge amount, and current gas price.

Maintenance management module 33: used to eliminate HP and LP failures, overflow failure, overtime failure, and magnetic disturbance failure.

Meter replacement management module 34: used to inquiry the information of the recorded faulted meter, record the information of the new meter and transfer the data.

After setting working state management system of gas meter 26 in a computer control system 24, the signal receiver 9 of data transmission module 4 in gas meter collects signal and command via cable and wireless transmission. One case is, by CPU control module 3, to adjust user ID, user meter number, user password, total charge amount, balance, total gas consumption, unit price of gas, alarm amount and operation condition of gas meter in EEPROM data memory 8 and encode them; the other case is, when abnormal condition is monitored by CPU, to encode data of over flow rate and magnetic disturbance and pack these encoded abnormal conditions and send them to working state management system 26 via signal transmitter 13 in data transmission module 4.

The adjustment of real-time gas price defined in this invention is performed as follows: When gas supplier plans to adjust gas price, he can use control signal sent by working state management system 26 to signal receiver 9 and transmitter 11 in data transmission module of gas meter 4, and transmit encoded command via RS485 bus to CPU controller 20 in CPU control module 3, then CPU controller 20 decodes this command to further gas price adjustment along with deducting circuit controlled master meter. After price adjustment, the charge amount in EEPROM data memory 8 will be updated and number-deducting circuit 21 will perform deduction according to new price.

The function of charge-upon-use described in this invention is unleashed as: When gas user consumes gas, the data and record of consumption will be stored in EEPROM data memory. As gas user pays bill to gas supplier, supplier can obtain data from EEPROM data memory via control module then charge-upon-use can be realized with real-time and precise data. Signal receiver in data transmission module of gas meter will unpack the data package sent by computer management system via internet, and transmit unpacked data, via RS485 bus, to CPU controller for decoding. CPU controller will store the charge data of gas user in EEPROM data memory to help charge gas meter, as well as real-time query of gas consumption data and real-time adjustment of gas price to be remotely performed.

The data on internet 21 and IOT transmitted by IOT intelligent gas meter is required to be encoded, while its cipher key can be set by gas company and changed at all time and updated into gas meter terminal. As cipher key is changed, computer control system 24 will send a packed command of cipher key modification to gas meter terminal 1, and signal receiver 9 in data transmission module 4 will unpack it and revert it to operable command of cipher key modification and transmit to CPU controller 20 with realization of cipher key update.

Upon adoption of TOT intelligent gas meter and its control system provided by this invention, the business network of gas supplier can be managed via network, and user resource can be shared via internet 21. So gas user doesn't need to pay bill at regular service center as well as convenient charge, and computer control system can control gas meter data and feed back use data of gas meter terminal to working state management system 26 for acquiring application data of the terminal.

The protection range of this invention is not limited to above applications, and all above examples are premium applications and not limited to invention itself. Any replacement, modification and cancellation of this TOT intelligent gas meter and gas meter terminal of control system and all modules in control system are protected by this invention.

The invention claimed is:

1. An internet of things (IoT) intelligent gas meter system, comprising:
   a gas source outlet and a gas source inlet installed on a base meter, an electromechanical valve installed near the gas source inlet, a Central Processing Unit (CPU) control module to send a control signal to the base meter, wherein the CPU control module includes an EEPROM data storage device and is connected to the base meter;
   and
   a gas consumption criterion of the base meter is adjusted in real-time in response to the control signal from the CPU control module, wherein the criterion is determinable by gas prices;
   wherein the adjustment to the gas consumption criterion of the base meter is determined by:
   a data transmission module to receive the control signal from a remote computer management system and feedback gas consumption information relevant to a gas meter sent from the CPU control module to the remote computer management system, wherein the data transmission module is indirectly connected to the internet and connected to the remote computer management system via the internet;
   the data transmission module, which includes a signal transmitter and signal receiver, to exchange data with the CPU control module via a data command busbar, wherein the signal transmitter is connected to a data concentrator in a wired or wireless manner, wherein the data concentrator is connected to the Internet via a network communication protocol and sends the gas consumption data from the gas meter to the remote computer management system in the form of data packets; and the CPU control module adjusts and encrypts the data in the EEPROM data storage device and sends the encrypted data to the Internet via the signal transmitter according to the network communication protocol in the form of data packets, wherein the encrypted data includes an abnormal condition which includes an overflow rate or magnetic disturbances, and the data packets are forwarded to the remote computer management system across the Internet, and wherein the remote management system is further connected to a plurality of IoT intelligent gas meters, wherein each IoT intelligent gas meter is a node in a control system, wherein the nodes are connected to the data concentrator and transmit data to the data concentrator, wherein the data concentrator, after data is collected from each node, is connected to the Internet via an interface and transmits the data to the remote computer management system, and wherein the remote computer management system is integrated with a charge management system and a working state management system for gas meters, wherein the charge management system comprises:

a basic data module to manage site settings, regional settings, meter type settings, payment type settings, manufacturer settings, administrator settings and invoice format settings;

a gas sales business management module to open an account, pay fees, refund and supplement gas for a gas consumer;

a financial statements management module to prepare a basic information report of the gas consumer, payment information reports of the gas consumer, the meter reading information report of the gas consumer, daily report, monthly report and annual reports;

wherein the working state management system of gas meter comprises:

a regional management module to set a management site, management community, management unit and a management building;

a user management module to cancel the account, transfer and modify basic information of the gas consumer;

a usage state management module to inquiry a historical status and an instantaneous state, wherein the historical status inquiry includes a historical query of a remote switch valve, a historical query of remote meter reading, historical query of online payment and historical query of gas price adjustment, wherein the instantaneous state inquiry includes a low gas alarm query, a high-low pressure protection query, a super flow protection query, a time-out protection query, a strong magnetic protection query, a remaining amount of gas query, a cumulative gas consumption, a cumulative recharge amount query and an instant gas price query;

a maintenance management module to eliminate HP and LP failures, superfluid failure, timeout failure and magnetic interference failure;

a meter replacement management module to inquiry the information of a recorded faulted meter, record information of a new meter and transfer data.

2. The IoT intelligent gas meter system, according to claim 1, wherein the data command busbar is a RS485 busbar, and the network communication protocol is a Transmission Control Protocol and Internet Protocol (TCP/IP) communication protocol or a User Datagram Protocol (UDP) communication protocol.

3. The IoT intelligent gas meter system, according to claim 2, wherein the data command busbar is a RS485 busbar, and the network communication protocol is a Transmission Control Protocol and Internet Protocol (TCP/IP) communication protocol or a User Datagram Protocol (UDP) communication protocol.

4. The IoT intelligent gas meter system, according to claim 2, wherein:

the wireless transmission mode is any one of an infrared signal, optical signal, ultrasonic signal, microwave signal or a General Packet Radio Service (GPRS) signal;

and the wire mode transmission mode is any one of an optical fiber transmission, power line carrier, RS232 busbar, RS485 busbar, M-BUS instrumentation busbar, CAN busbar.

5. The IoT intelligent gas meter system, according to claim 1, wherein the CPU control module further includes FLASH program memory for storing a control program operated in the CPU control module and specifies the program in the FLASH program memory to make the gas meter complete processing work of signal reception and feedback.

6. The IoT intelligent gas meter system, according to claim 1, wherein the CPU control module further includes FLASH program memory for storing a control program operated in the CPU control module and specifies the program in the FLASH program memory to make the gas meter complete processing work of signal reception and feedback.

7. The IoT intelligent gas meter system, according to claim 1, wherein the CPU control module includes a CPU controller, which is respectively connected to:

a sampling circuit of a counting dry reed pipe, a control circuit of electromechanical valve, a number-deducting circuit and liquid crystal display circuit, wherein the CPU controller is connected with the counting dry reed pipe via the sampling circuit of the counting dry reed pipe, the CPU controller is connected with the electromechanical valve via the electromechanical valve control circuit and controls the opening and closing thereof, the CPU controller is connected with a liquid crystal display (LCD) via the liquid crystal display circuit and controls the data displayed by the LCD, the CPU controller is connected with the EEPROM data memory via the number-deducting circuit and conducts the deduction processing to the gas meter in combination with the number-deducting circuit.

8. The IoT intelligent gas meter system according to claim 1, wherein the interface of the IoT is any one of a dial-up interface of a telephone line, an optical fiber broadband interface, an asymmetric digital subscriber line (ADSL) interface and a general packet radio service (GPRS) interface.

* * * * *